(12) United States Patent
Wang et al.

(10) Patent No.: US 7,019,840 B2
(45) Date of Patent: Mar. 28, 2006

(54) DUAL-BEAM INTERFEROMETER FOR ULTRA-SMOOTH SURFACE TOPOGRAPHICAL MEASUREMENTS

(75) Inventors: Jianmin Wang, Fremont, CA (US); Jason L. Pressesky, Menlo Park, CA (US); Li-Ping Wang, Fremont, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 304 days.

(21) Appl. No.: 10/690,447

(22) Filed: Oct. 21, 2003

(65) Prior Publication Data

US 2004/0257582 A1  Dec. 23, 2004

Related U.S. Application Data

(60) Provisional application No. 60/479,294, filed on Jun. 17, 2003.

(51) Int. Cl.
*G01B 9/02* (2006.01)

(52) U.S. Cl. .................................. 356/495; 356/516
(58) Field of Classification Search ................ 356/495, 356/516

See application file for complete search history.

(56) References Cited

U.S. PATENT DOCUMENTS

| | | | |
|---|---|---|---|
| 4,128,337 A | | 12/1978 | Zehnpfennig |
| 4,833,314 A | | 5/1989 | Pepper |
| 5,469,259 A | * | 11/1995 | Golby et al. ................. 356/495 |
| 5,574,560 A | | 11/1996 | Franz |
| 5,671,050 A | | 9/1997 | de Groot |
| 5,699,160 A | * | 12/1997 | Barenboim et al. ......... 356/495 |
| 5,703,684 A | * | 12/1997 | Lu et al. ...................... 356/507 |
| 5,710,631 A | * | 1/1998 | Bou-Ghannam et al. .... 356/495 |
| 5,737,079 A | | 4/1998 | Burge |
| 5,784,163 A | * | 7/1998 | Lu et al. ...................... 356/495 |
| 5,838,441 A | | 11/1998 | Satorius |
| 5,877,856 A | * | 3/1999 | Fercher ....................... 356/495 |
| 5,999,261 A | | 12/1999 | Pressesky |
| 6,034,924 A | | 3/2000 | Vakoc |
| 6,097,486 A | | 8/2000 | Vakoc |

(Continued)

OTHER PUBLICATIONS

G.E. Sommargren, "Optical heterodyne profilometry," App. Opt., 20, (4) 610-618, 1981.

(Continued)

*Primary Examiner*—Gregory J Toatley, Jr.
*Assistant Examiner*—Patrick J. Connolly

(57) ABSTRACT

A method and apparatus for using a dual-beam interferometer to test surface flatness is provided. The interferometer directs two beams focused at distinct points on a testing surface, such as the surface of a magnetic recording disc. An offset distance "d" between the two beams is provided on the target surface. In the present invention, the separation distance "d" is adjustable. The feature of adjustable separation distance in the interferometer allows the interferometer to meet the different spatial frequency requirements of various applications. In operation, first and second reflected beams are returned to an intensity beam splitter, where they are split and then recombined into two new beams of substantially equal intensity. The second of the two new light beams is constructed by the interference of half intensity of the first and half intensity of second beams, and is sent to a photodiode. The photodiode generates signals in response to the changing interference fringes caused as a result of the modulation of the optical path length difference between the original first and second beams. A local height difference on the reflective surface is calculated relative to the separation distance "d".

24 Claims, 2 Drawing Sheets

U.S. PATENT DOCUMENTS

| | | | |
|---|---|---|---|
| 6,278,657 B1 | 8/2001 | Vakoc | |
| 6,529,444 B1 | 3/2003 | Vakoc | |
| 6,657,216 B1* | 12/2003 | Poris | 250/559.22 |
| 6,690,473 B1* | 2/2004 | Stanke et al. | 356/511 |

OTHER PUBLICATIONS

M.J. Downs, N.M. Mason and J.C. Nelson, "Measurement of the profiles of 'super-smooth' surface using optical interferometry," in Surface Measurement and Charachterization, Proc. SPIE, 1009, 14-17, 1988.

J.M. Zavislan and J.M. Eastman, "Microprofiling of precision surfaces," in Measurement and effects of surface defects and Quality of Polish, Proc. SPIE, 525, 169-173, 1985.

T.C. Bristow and D. Lindquist, "Surface measurements with a non-contact Normarski-profiling instrument," in Interfermetric Metrology, Proc. SPIE, 816, 106-110, 1987.

Jianmin Wang and Ian Grant, "ESPI, Phase mapping, NDT the techniques applied to real-time, thermal loading," Appl. Opt. 34, 3620-3627, (1995).

Jianmin Wang and Jason Pressesky, "Quadrature Phase Shift Interferometer (QPSI) Decoding Algorithm," Seagate disclosure, STL 3304, 2003.

Shih-Fu Lee, Young Hu and David S. Kuo, "Monitoring magnetic disk waviness using head AAB tranfer function and HMS modulation," Seagate disclosure, STL 3025, 2001.

* cited by examiner

DUAL-BEAM INTERFEROMETER FOR ULTRA-SMOOTH SURFACE TOPOGRAPHICAL MEASUREMENTS

RELATED APPLICATIONS

This new application for letters patent claims priority from an earlier-filed provisional patent application entitled. That application was filed on Jun. 17, 2003 and was assigned Application No. 60/479,294.

BACKGROUND OF THE INVENTION

1. Field of the Invention

The present invention relates to characterization of a flat surface. More specifically, the present invention pertains to the use of an optical interferometer to analyze the flatness of a flat surface. Further still, the present invention presents an apparatus and method for profiling a smooth surface, such as the surface of a magnetic recording disc.

2. Description of the Related Art

The computer industry employs magnetic discs for the purpose of storing information. In this respect, computer systems employ disc drive systems for transferring and storing large amounts of data between magnetic discs and the host computer. The magnetic discs are typically circular in shape, though other shapes are used. One or more discs may be used in a disc drive system, depending on the needs of the system and the capacity of the drive.

It is desirable that the surface of a magnetic disc be as flat as possible. Uniform flatness aids in maintaining a constant fly-height of the slider, where the magnetic read/write head operates over the disc surface. This, in turn, ensures accurate writing/reading of magnetic data by the read/write head to and from the disc. Flat surface topography also allows the slider and attached magnetic head to fly more closely to the disc surface, permitting a tighter concentration of magnetic data to be embedded in the disc. Thus, periodic surface characterization of magnetic discs is part of the quality control employed in the manufacturing process.

In order to accurately analyze surface topography in ultra-smooth surfaces, it is known to use an optical interferometer. An optical interferometer is a tool that provides the unique advantages of non-contact operation, high resolution, wide spatial frequency coverage and high throughput. However, conventional interferometers are extremely sensitive to environmental vibration.

In a conventional interferometer, the surface topography is inferred by measuring the optical path length difference between an object beam and a reference beam. The reference beam length is usually fixed to be a constant length. Environmental vibration can cause body movement between the interferometer and the test object, which in turn can introduce a spurious change of optical path length in the object beam. Stated another way, if the disc surface experiences vertical vibration, the optical path length difference between the object and reference beams can no longer be kept constant. This vibration-induced optical path length change will then be confounded with the signal of interest originating from the surface topography of the test object, e.g., a magnetic disc surface.

An effective solution to reduce the effect of environmental vibrations in interferometers is to translate the optical path length change caused by body movement into both the reference beam and the object beam. Such interferometers are known as common-path interferometers. There are three types of common-path interferometers; the heterodyne interferometer, the interferometer with a bifringent lens, and the scanning shearing interferometer. A common feature of these interferometer designs is the use of a single lens to deliver two beams to the object surface. The two beams are offset in striking the target surface. The two beams are typically generated by using a birefringent lens or a Wollaston prism. However, in these designs the separation distance "d" between the two beams as they strike the target surface is fixed. Moreover, the separation distance is limited by the numerical aperture of the lens and/or Wollaston prism. The maximum measurable spatial frequency is subsequently limited by these components.

Therefore, a need exists for an optical interferometer that insures a constant optical path length difference between the object and reference beams while the disc is experiencing the environmental vibration, which should cause the disc surface moving up and down. Still further, a need exists for an optical interferometer that permits adjustment of the separation distance between the two beams as they strike the target surface.

SUMMARY OF THE INVENTION

This disclosure describes a surface profiler using a dual-beam interferometer. The interferometer tool is designed to provide an optical, non-contact testing method for measuring and characterizing ultra-smooth surfaces. Examples of applications for the interferometer tool include the surfaces of magnetic recording discs and of semiconductor wafers.

The interferometer of the present invention is a common-path interferometer. The interferometer directs two beams focused at two distinct points on the testing surface. An offset distance "d" between the two beams is provided on the target surface. In the present invention, the separation distance "d" is adjustable. The interferometer requires neither a birefringent lens nor a Wollaston prism to generate the two separated beams; but uses instead known optical components. The feature of adjustable separation distance in the interferometer provides an efficient and accurate hardware low pass filter with which to meet the different spatial frequency requirements for various applications. Further, the reduced sensitivity to the environmental vibration qualifies this type of interferometer for applications requiring a portable device.

Generally, the optical interferometer first comprises a light source for generating a light beam. In one arrangement, the light beam is initially in the P-polarization state. The light beam is first directed to a first beam splitter. The beam splitter receives the light beam, and divides it into first and second beams. The first and second beams are of substantially equal intensity.

A half wave plate is provided for receiving the second beam from the first beam splitter. The half wave plate converts the second light beam from its P-polarization state to the S-polarization state.

The optical interferometer also comprises a polarizing cube beam splitter. The polarizing cube beam splitter receives and transmits the first light beam to the reflective surface, i.e., the test object. The polarizing cube beam splitter further receives and reflects the second light beam to the reflective surface. The first and second light beams are directed such that the first and second light beams are received at the reflective surface an offset distance "d" apart.

The first and second light beams are reflected back to the first beam splitter. Upon reflection, the light beams are split again and then the beams that travel in a same direction will be recombined. The process of splitting and recombining beams forms new first and second light beams. The new second light beam is constructed by the half intensity of the first beam and the half intensity of the second beam, and produces interference fringes as a result of the modulation of the optical path length difference between the new first and second beams. The new second light beam is directed to a photodiode. The photodiode receives the new second light beam, and converts the intensity of new second beam into electrical signals. These signals are representative of irregularities in the target surface and are later processed for analysis.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE INVENTION

Figure 1:
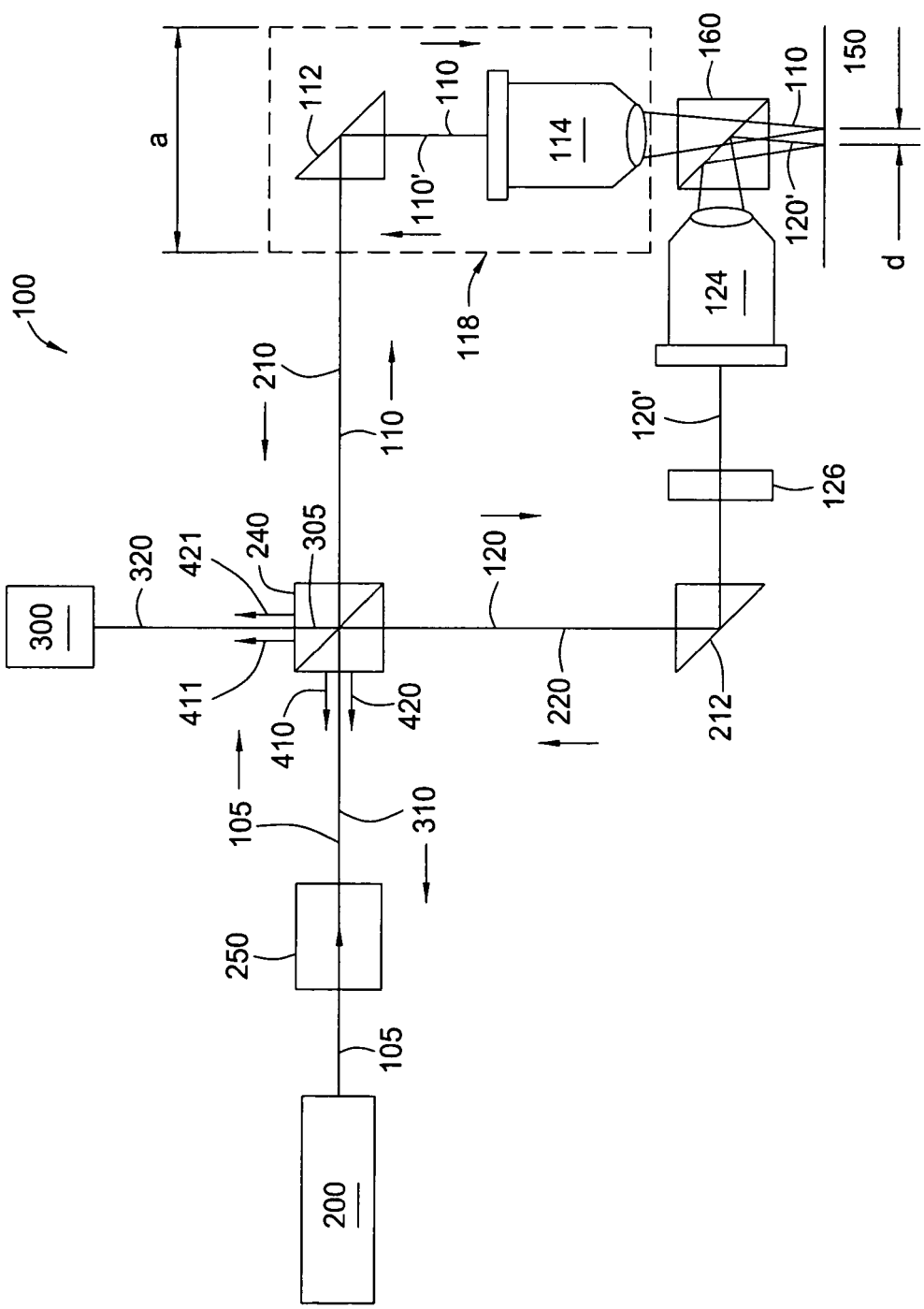
FIG. 1 presents a schematic diagram of parts comprising the dual beam optical interferometer of the present invention, in one embodiment.

FIG. 1 presents a diagram of a dual-beam, common path optical interferometer 100 of the present invention, in one embodiment. As the title implies, two beams 110 and 120 are generated through the interferometer 100. The beams 110, 120 are directed towards a target surface 150 under analysis. In the exemplary arrangement of FIG. 1, the target surface 150 is a mirror-like, highly reflective, ultra-smooth disc surface, such as the surface of a magnetic data storage disc. However, it is understood that the present invention has utility in measuring smoothness of other smooth surfaces, such as silicon dioxide wafers.

In the present apparatus, a light source 200 is first provided. Preferably, the light source 200 defines a He—Ne laser. The laser 200 supplies a single, polarized laser beam 105, in which the beam 105 is continuous. The beam 105 may be in either the P-polarization state or the S-polarization state, depending upon the configuration of other components as will be shown.

The polarized beam 105 is transmitted through an optical isolator 250. The optical isolator 250 serves to direct the light beam 105, and prevents the light beam 105 from returning to the laser 200 during the disc testing process. An example of a suitable optical isolator is product no. 501010 manufactured by Linos Photonics.

Once the polarized beam 105 is transmitted through the optical isolator 250, it is directed to a first beam splitter 240. The beam splitter 240 is an intensity beam splitter. The beam splitter 240 divides the single beam 105 into two parts of substantially equal intensity. The two beams are designated as beam one 110 and beam two 120. Beam one 110 and beam two 120 each remain in their original state of polarization at this point. In the preferred embodiment for the method and apparatus of the present invention, the polarization state is the P-polarization state.

Each beam 110, 120 is transmitted to a mirror. Beam one 110 is transmitted through the beam splitter 240 to mirror one 112, while beam two 120 is redirected at 90 degrees by the first beam splitter 240 to mirror two 212.

As shown in the diagram of FIG. 1, mirror one 112 reflects beam one 110 at 45 degrees. Likewise, mirror two 212 reflects beam two 120 at 45 degrees. The result is that each beam 110, 120 is redirected at 90 degrees towards the same location, i.e., a polarizing cube beam splitter 160.

En route to the polarizing cube beam splitter 160, beam one 110 passes through a long working distance objective ("LWO one") 114. LWO one 114 serves to focus beam one 110 onto a target surface 150. Beam one 110 passes through the polarizing cube beam splitter 160 before hitting the target surface 150. Because the beam 110 is in its P-polarization state, it is transmitted essentially straight through the cube beam splitter 160 and onto the target surface 150.

Referring back now to beam two 120, beam two 120 moves from mirror two 212 and also moves towards a long working distance objective. In this case, the long working distance objective is "LWO two" 124. However, beam two 120 passes through a half-wave plate ("HWP") 126 before it is focused onto the target surface 150 by LWO two 124. The HWP 126 is aligned so that the transmitted beam 120' consists primarily of S-polarized light. Thus, the light 120' received and focused by the long working distance objective two 124 is in the S-polarization state.

The S-polarized beam 120' is received by the cube beam splitter 160. The S-polarized beam 120' is not transmitted through the cube beam splitter 160, but is reflected onto the target surface 150 at a designated angle. In the arrangement shown in FIG. 1, the reflection angle is 45 degrees.

In the diagram of FIG. 1, it can be seen that beam one 110 and beam two 120' do not strike the target surface 150 at the same location. In this respect, a distance "d" is defined by the separation between the two target strikes. This distance is created by virtue of placement of mirror one 112.

In one arrangement, the objective LWO one 114 and mirror one 112 are built together as a block assembly. The block assembly is shown schematically in phantom at 118. The assembly 118 is connected to a piezoelectric translator (not shown). The piezoelectric translator provides movement of the block 118 parallel to beam one 110 with an accuracy and resolution of less than 1 nanometer resolution. Bilateral movement of the block 118 is shown by arrow "a." This allows the apparatus 100 to accurately control and adjust the separation distance "d" between beam one 110 and beam two 120 as the beams 110, 120 strike the target surface 150.

Figure 2:
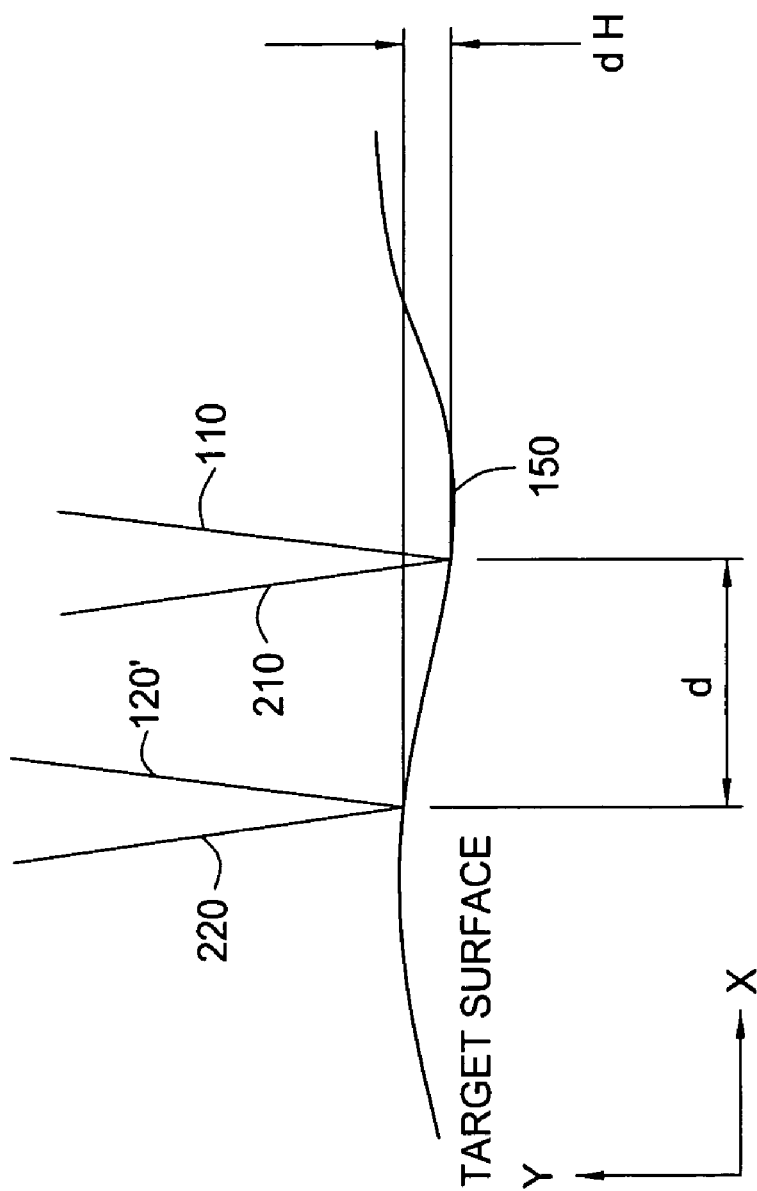
FIG. 2 is a schematic representation of a target surface, such as the upper surface of a magnetic disc. Two beams as generated in the diagram of FIG. 1 are seen striking the target surface in offset fashion.

FIG. 2 is a schematic representation of a target surface 150, such as the upper surface of a magnetic disc. Two beams 110, 120' as generated in the diagram of FIG. 1 are seen striking the target surface 150 in offset fashion. Beam one 110 and beam two 120' reflect off the target surface 150. The reflected beams are shown as 210 and 220, respectively. Thus, FIG. 2 is an enlarged view of a portion of FIG. 1. In FIG. 1, the target surface 150 appears planar. However, in the enlarged view of FIG. 2, a surface irregularity is visible.

It will be understood by those of ordinary skill in the art that a magnetic disc surface is not always perfectly planar, but may have topographical variations. In the view of FIG. 2, a topographical variation is demonstrated by local amplitude "dH." A magnetic disc having a significant surface amplitude dH within a short wavelength is considered defective.

After striking the mirror-like surface 150, each beam 110, 120' is reflected back towards the polarizing cube beam splitter 160. The beams 210, 220 reflect back from the focal points along their respective original paths. Thus, reflected beam one 210 returns through the LWO one 114, against mirror one 112, and back to the original beam splitter 240. Reflected beam two 220 reflects against the polarizing cube beam splitter 160, passes through the LWO two 214, reflects again against mirror two 212, and returns to the intensity beam splitter 240. Beam two 220 returns to its original polarization state after transmitting through half wave plate 126. Therefore, the beams 210 and 220 can interfere with each other once they recombine again at beam splitter 240. The two reflected beams 210, 220 are each split at the original beam splitter 240. The reflected first beam 210 splits into beams 410 and 411 Beam 410 travels back towards optical isolator 250, while beam 411 reflects to a photodiode 300. In similar fashion, the second reflected beam 220 also splits into two beams, to wit, beams 420 and 421. Beam 420 is reflected towards the optical isolator 250, while beam 421 travels on to the photodiode 300. Each beam 410, 411 and 420, 421 is comprised in approximately 50/50 ratios of the reflected first 210 and second 220 beams. A new recombined first beam 310 is thus formed by beams 410 and 420, and a new recombined second beam 320 is thus formed by beams 411 and 421 at the intensity beam splitter 240.

The newly constituted first beam 310 travels towards to the laser 200. However, the new first beam 310 is blocked by the optical isolator 250 before it returns into the laser 200. The newly constituted second beam 320 travels towards the photodiode 300. This new second beam 320 received at the photodiode 300 produces interference fringes as a result of the modulation of the optical path length difference between the two beams 210, 220.

The photodiode 300 captures these moving or changing fringes, which are observed as temporal variations in light intensity. The photodiode 300 then delivers a voltage signal proportional to the temporal light intensity change. This voltage signal "s," in turn, can be analyzed by subsequent digital signal processing as is known in the art.

The signals, I, detected by the photodiode 300 are described by:

$$I = I_1 + I_2 + 2\sqrt{I_1 \cdot I_2} \cdot \cos(\phi) \tag{1}$$

where, $I_1$ and $I_2$ are the intensities of beam 411 and beam two 421, respectively, and Ø is the phase difference between the two beams 411 (or 210), 421 (or 220). The phase difference Ø is a function of the optical path length difference, ΔL, between the two beams 210, 220, which is presented in the equation:

$$\phi = \frac{2\pi \Delta L}{\lambda} \tag{2}$$

where, λ is the wavelength of the laser light.

Based on the geometry of FIG. 2, which shows a magnified view of the beams' focusing area, ΔL can be described by:

$$\Delta L = 2(d + dH) \tag{3}$$

where d is the separation of beam one 110 and beam two 120', and dH is the height difference between the two focal points of beam one 110 and beam two 120' on the object surface 150. Equation (2) can then be rewritten as:

$$\phi = \frac{4\pi d}{\lambda} + \frac{4\pi dH}{\lambda} = \Phi + \frac{4\pi dH}{\lambda} \tag{4}$$

The first term in the equation (4) is a constant because the beam separation d is pre-determined based on the minimum spatial wavelength required to be detected. Therefore, the phase angle Ø is a function of dH, which is itself a function of the local surface slope. By solving equations (1) and (4) based on the intensity value I detected from photodiode 300, the local height difference dH can be obtained. Subsequently, the local slope dS can be calculated by:

$$dS = dH/d \tag{5}$$

If we assume that the surface profile can be described by f(x), as shown in FIG. 2, then df/dx=slope, or df/dx≈dS. Here, dx is d, the separation of beam one 110 and beam two 120'. The profile or topography of the surface 150 can then be calculated by integration of the slope information.

In equation (1), there are two other unknowns, to wit, $I_1$ and $I_2$, that must be resolved before equation (1) can be solved. These two unknowns can be obtained by using $I_{max}$ and $I_{min}$ techniques. The $I_{max}$ and $I_{min}$ techniques are described in J. Wang and I Grant, "*ESPI, Phase Mapping, NDT The Techniques Applied to Real-Time, Thermal Loading,*" Applied Optics 34, 3620–3627 (1995).

With the current optical setup, the approach for obtaining $I_{max}$ and $I_{min}$ can be determined by moving the block assembly 118 backward and forward with the piezoelectric translator in order to vary the optical path length difference between the two beams, ΔL, such that a full cycle or more of moving interference fringes are generated. As long as the moving distance is greater than laser light wavelength, a full cycle moving fringe will be generated. The intensities of the moving fringes can be detected by the photodiode 300. From there, the $I_{max}$ and $I_{min}$ can then be obtained. We can then re-write Equation (1) as:

$$I = I_a + I_b \cdot \cos(\phi) \tag{6}$$

where $I_a = I_1 + I_2 = \frac{I_{max} + I_{min}}{2}$ and $I_b = 2\sqrt{I_1 \cdot I_2} = \frac{I_{max} - I_{min}}{2}$.

The profiling dynamic range is determined by the local height difference, dH, which is caused by the slope of the surface topography. The maximum dH which can be observed without causing a phase unwrapping problem is given by the second term of Equation (2) when it is set equal to π.

$$\pi = \frac{4\pi dH}{\lambda} \text{ or} \tag{7}$$

$$dH = \frac{\lambda}{4} \tag{8}$$

A He—Ne laser has a known wavelength of 0.6328 μm. When using a He—Ne laser, the maximum dH is 0.133 μm. This range is much greater than the maximum local slope on an ultra-smooth surface, such as a hard disc surface. For instance, a typical hard disc, whose surface topography in the circumferential direction can be depicted by a sinusoidal function with 5 μm amplitude, or 10 μm peak-to-peak in amplitude, has a maximum dH of 0.004 µm for a radius of 25.4 mm and a sampling interval d of 10 µm. Therefore, this interferometer does not require phase unwrapping for most applications involving smooth surfaces. This increases the accuracy of the measurement and reduces the data processing time.

Various applications may be made with the dual beam interferometer of the present invention. Because the body movement between the profiling interferometer 100 and the testing object 150 will have little or no effect on the surface topography measurement, this type profiler 100 is well-suited to portable applications. For instance, the profiler 100 could be used for measuring HMS_Wq of the disc 150 on all kind of spindles, include measuring the discs in assembled hard disk drives. The profiler 100 may also be used for measuring disc edge roll-off without the need for an ultra-flat motion stage.

While the foregoing is directed to embodiments of the present invention, other and further embodiments of the invention may be devised without departing from the basic scope thereof. For instance, the light source 200 may generate a continuous light beam 105 that is in the S-polarization state rather than the P-polarization state. In this instance, the half wave plate 126 would be in the path of beam one 110 rather than in the path of beam two 120.

The invention claimed is:

1. An optical interferometer for measuring the surface profile of a smooth, reflective surface, comprising:
   a light source for generating a light beam in a first polarization state;
   a first beam splitter for receiving the light beam and for dividing the light beam into original first and second beams of substantially equal intensity;
   a half wave plate for receiving the original second beam from the first beam splitter, and converting the second light beam to a different polarization state;
   a polarizing cube beam splitter for receiving and transmitting the original first light beam to the reflective surface at a first point, and for receiving and reflecting the original second light beam to the reflective surface at a second point such that the original first and second light beams are received at the reflective surface an offset distance apart, and such that the original first and second light beams are reflected back to the first beam splitter where they are split and then recombined into new first and second light beams; and
   a photodiode for receiving the new second light beam, the new second light beam being constructed by the interference of the half intensity of the original first and the half intensity of the original second light beams, and the photodiode generating signals in response to the changing interference fringes caused as a result of the modulation of the optical path length difference between the original first and second beams so that a local height difference on the reflective surface between the first and second surface points may be determined.

2. The optical interferometer of claim 1, wherein:
   the light source generates a light beam in its P-polarization state; and
   the original second beam is converted by the half wave plate to its S-polarization state.

3. The optical interferometer of claim 2, wherein the light source is a He—Ne type source.

4. The optical interferometer of claim 2, further comprising a first mirror for receiving and reflecting the original first light beam from the first beam splitter, and reflecting it to the polarizing cube beam splitter.

5. The optical interferometer of claim 4, further comprising a second mirror for receiving and reflecting the original second light beam from the first beam splitter, and forwarding it to the half wave plate.

6. The optical interferometer of claim 5, further comprising a first long working distance objective for receiving the reflected original first light beam from the first mirror before it passes through the polarizing cube beam splitter.

7. The optical interferometer of claim 6, further comprising a second long working distance objective for receiving the reflected original second light beam from the second mirror before it is reflected by the polarizing cube beam splitter.

8. The optical interferometer of claim 2, wherein the first objective long working object and the first mirror are built together as a block assembly, the block assembly being connected to a piezoelectric translator.

9. The optical interferometer of claim 1, wherein the target surface defines the surface of a magnetic recording disc.

10. A method for detecting flatness in a reflective surface, comprising the steps of:
    generating a light beam in the P-polarization state with a light source;
    splitting the light beam into first and second beams of substantially equal intensity;
    directing the first beam from the first beam splitter through a polarizing cube beam splitter, the polarizing cube beam splitter receiving and transmitting the first light beam to the reflective surface at a first point;
    directing the second beam from the first beam splitter through a half wave plate, and converting the second light beam to a S-polarization state;
    directing the second beam to the polarizing cube beam splitter, the polarizing cube beam splitter receiving and reflecting the second light beam to the reflective surface at a second point such that the first and second light beams are received at the reflective surface an offset distance apart;
    reflecting the first and second light beams from the reflective surface back to the first beam splitter;
    splitting the first and second light beams in the first beam splitter;
    recombining the split light beams into new first and second light beams; and
    directing the new second beam to a photodiode, the new second light beam being constructed by the interference of the half intensity of the first beam and the half intensity of the second beam, and the photodiode generating signals in response to the changing interference fringes caused as a result of the modulation of the optical path length difference between the first and second light beams so that a local height difference on the reflective surface between the first and second surface points may be determined.

11. The method for detecting smoothness of claim 10, wherein the light source is a He—Ne type laser.

12. The method for detecting smoothness of claim 10, further comprising a first mirror for receiving and reflecting the first light beam from the first beam splitter, and reflecting it to the polarizing cube beam splitter.

13. The method for detecting smoothness of claim 12, further comprising a second mirror for receiving and reflecting the second half wave plate.

14. The method for detecting smoothness of claim 13, further comprising a first long working distance objective for receiving the reflected first light beam from the first mirror before it passes through the polarizing cube beam splitter.

15. The method for detecting flatness of claim 14, further comprising a second long working distance objective for receiving the reflected second light beam from the second mirror before it is reflected by the polarizing cube beam splitter.

16. The method for detecting flatness of claim 10, wherein the first objective long working object and the first mirror are built together as a block assembly, the block assembly being connected to a piezoelectric translator.

17. The method for detecting flatness of claim 10, wherein the target surface defines a surface of a magnetic disc.

18. The method for detecting flatness of claim 10, further comprising the step of:
processing the signals generated by the photodiode to analyze irregularities in the target surface.

19. A method for detecting surface flatness of a magnetic disc, comprising the steps of:
providing a dual-beam, common path interferometer on the magnetic recording disc, the interferometer providing a pathway for a first light beam of a first polarization state to the magnetic disc surface, and a pathway for a second light beam having a second polarization state to the magnetic disc surface;
directing the first light beam onto the magnetic disc surface at a first point;
directing the second light beam onto the magnetic recording disc surface at a second point, the horizontal distance between the first point and the second point being defined by a distance "d";
adjusting the distance "d" by adjusting the pathway for the first light beam;
reflecting the first and second light beams to an intensity beam splitter, the first and second light beams intersecting at the intensity beam splitter and forming new first and second light beams;
directing the new second light beam to a photodiode, the new second light beam being constructed by the interference of half intensity of the first beam and half intensity of the second beam, and the photodiode generating signals in response to changing interference fringes caused as a result of the modulation of the optical path length difference between the first and second light beams so that a local height difference on the reflective surface between the first and second surface points may be determined.

20. The method for detecting flatness of claim 19, wherein the dual-beam, common path interferometer comprises:
a light source for generating a light beam in its P-polarization state;
the intensity beam splitter for receiving the light beam and for dividing the light beam into the first and second beams, the first and second beams having substantially equal intensity;
a half wave plate for receiving the second beam from the intensity beam splitter, and converting the second light beam into its S-polarization state;
a polarizing cube beam splitter for receiving and transmitting the first light beam to the magnetic recording disc surface, and for receiving and reflecting the second light beam to the magnetic recording disc surface such that the first and second light beams are reflected back to the intensity beam splitter where they intersect and then split into new first and second light beams; and
the photodiode for receiving the new second light beam.

21. The method for detecting smoothness of claim 20, wherein the light source of the interferometer is a He—Ne type laser.

22. The method for detecting flatness of claim 20, wherein the interferometer further comprises:
a first mirror for receiving and reflecting the first light beam from the intensity beam splitter, and reflecting it to the polarizing cube beam splitter; and
a second mirror for receiving and reflecting the second light beam from the intensity beam splitter, and forwarding it to the half wave plate.

23. The method for detecting flatness of claim 22, wherein the interferometer further comprises:
a first long working distance objective for receiving the reflected first light beam from the first mirror before it passes through the polarizing cube beam splitter; and
a second long working distance objective for receiving the reflected second light beam from the second mirror before it is reflected by the polarizing cube beam splitter.

24. The method for detecting flatness of claim 23, wherein the first objective long working object and the first mirror are built together as a block assembly, the block assembly being connected to a piezoelectric translator.

* * * * *